US010637886B2

(12) United States Patent
Yoo et al.

(10) Patent No.: US 10,637,886 B2
(45) Date of Patent: Apr. 28, 2020

(54) SOFTWARE DEFINED NETWORK CAPABLE OF DETECTING DDOS ATTACKS AND SWITCH INCLUDED IN THE SAME

(71) Applicant: FOUNDATION OF SOONGSIL UNIVERSITY INDUSTRY COOPERATION, Seoul (KR)

(72) Inventors: Myungsik Yoo, Seoul (KR); Tri Hai Nguyen, Seoul (KR); Jin Seok Choi, Seoul (KR)

(73) Assignee: FOUNDATION OF SOONGSIL UNIVERSITY INDUSTRY COOPERATION, Seoul (KR)

( * ) Notice: Subject to any disclaimer, the term of this patent is extended or adjusted under 35 U.S.C. 154(b) by 12 days.

(21) Appl. No.: 15/692,271

(22) Filed: Aug. 31, 2017

(65) Prior Publication Data

US 2018/0109556 A1    Apr. 19, 2018

(30) Foreign Application Priority Data

Oct. 17, 2016  (KR) .................. 10-2016-0134382

(51) Int. Cl.
*H04L 29/06* (2006.01)
*H04L 12/931* (2013.01)
*H04L 12/26* (2006.01)

(52) U.S. Cl.
CPC ...... *H04L 63/1458* (2013.01); *H04L 63/1416* (2013.01); *H04L 63/1425* (2013.01); *H04L 43/0894* (2013.01); *H04L 49/70* (2013.01)

(58) Field of Classification Search
CPC . H04L 63/1458; H04L 49/70; H04L 63/1425; H04L 63/1416; H04L 43/0894; H04L 12/28; H04L 12/26; G06F 12/14

USPC .......... 370/257, 230.1; 726/22, 23; 709/223
See application file for complete search history.

(56) References Cited

U.S. PATENT DOCUMENTS

| 9,038,151 | B1* | 5/2015 | Chua ..................... H04L 45/02 709/223 |
| 2007/0014276 | A1* | 1/2007 | Bettink .................. H04L 45/00 370/351 |
| 2014/0089506 | A1* | 3/2014 | Puttaswamy Naga ..................... H04L 45/42 709/225 |
| 2014/0189867 | A1* | 7/2014 | Jung .................. H04L 63/1458 726/23 |

(Continued)

FOREIGN PATENT DOCUMENTS

KR    1020140088340 A    7/2014

OTHER PUBLICATIONS

Early detection of DDoS attacks against SDN controllers (Year: 2015).*

(Continued)

*Primary Examiner* — Thanhnga B Truong
(74) *Attorney, Agent, or Firm* — Hauptman Ham, LLP

(57) ABSTRACT

Software defined network capable of detecting a DDoS attack and a switch included in the same are disclosed. The software defined network comprises a controller arranged on a control plane of the software defined network, and a plurality of switches arranged on a data plane of the software defined network. Here, each of the switches collects packets received through corresponding external network and detects a DDoS attack by using the collected packets.

1 Claim, 4 Drawing Sheets

(56) References Cited

U.S. PATENT DOCUMENTS

2018/0109556 A1* 4/2018 Yoo .................. H04L 49/70

OTHER PUBLICATIONS

Seyed Mohammad Mousavi, Marc St-Hilaire, "Early Detection of DDoS Attacks against SDN Controllers", IEEE, 2015 International Conference on Computing, Networking and Communications, Communications and Information Security Symposium (Feb. 19, 2015).
Korean Office Action dated May 14, 2018, in connection with the Korean Patent Application No. 10-2016-0134382.

* cited by examiner

SOFTWARE DEFINED NETWORK CAPABLE OF DETECTING DDOS ATTACKS AND SWITCH INCLUDED IN THE SAME

PRIORITY

This application claims priority under 35 U.S.C. § 119(a) to a Korean patent application filed on Oct. 17, 2016 in the Korean Intellectual Property Office and assigned Serial No. 10-2016-0134382, the entire disclosure of which is incorporated herein by reference.

TECHNICAL FIELD

The present disclosure relates to a software defined network SDN capable of detecting DDoS attacks and a switch included in the same.

BACKGROUND ART

Internet plays inseparably an important role in our daily life, and it is predicted that role of Internet increases when internet of thing IoT is really applied to daily life. However, conventional network equipment operates according to a preset rule, and thus it is difficult to manage it and it is inconvenient that every related equipment must be updated or exchanged when new function is added. It seems that the network equipment is weak to various new malicious attacks in security.

Accordingly, a software defined network SDN has been developed to solve the above problem. Unlike the conventional network equipment, a control plane and a data plane are divided in the SDN. As a result, network architecture is simple, the network is flexibly managed, and the network is partially stronger to malicious attacks than the conventional network. However, the SDN does not provide perfect solution in security and it has still weakness in security.

Specially, DDoS attack means an attack in which attackers in distributed arrangement perform simultaneously denial of service attack DoS, and so a system cannot provide normal service. That is, if the DDoS attack is performed between the control plane and the data plane in the SDN, a controller cannot provide normally instruction to a data layer. If massive forged packets are delivered to a switch through the DDoS attack, overload is applied to the SDN, and thus the SDN cannot normally operate.

In recent, many researchers have been studied methods of detecting and reducing the DDoS attack in the SDN. A method of perfectly detecting and protecting the DDoS attack applied to the controller of the SDN has not been developed.

SUMMARY

Accordingly, the invention is provided to substantially obviate one or more problems due to limitations and disadvantages of the related art. One embodiment of the invention provides an SDN for detecting DDoS attacks in distributed manner and a switch included in the same.

Other features of the invention may be thought by a person in an art through following embodiments.

In one embodiment, the invention provides a software defined network comprising: a controller arranged on a control plane of the software defined network; and a plurality of switches arranged on a data plane of the software defined network. Here, each of the switches collects packets received through corresponding external network and detects a DDoS attack by using the collected packets.

Each of the switches may transmit a warning message to the controller when the DDoS attack is detected.

Each of the switches may determine that the DDoS attack is detected when entropy defined as following equation is smaller than preset critical value.

$$H = -\sum_{1}^{n} p_i \log p_i$$

Where $$p_i = \frac{x_i}{n}$$

$$W = \{(x_1, y_1), (x_2, y_2), \ldots \}$$

where, H, n, pi, x and y indicates respectively entropy, number of packets in a window W, probability of IP address of each of the packets in the window W, IP address of destination of the packets and number of time at which the packets are generate.

In another embodiment, the invention provides a switch included in a software defined network comprising: a collection unit configured to collect packets received through corresponding external network; and a detection unit configured to detect a DDoS attack by using the collected packets.

An SDN of the invention may detect accurately DDoS attacks with small overhead.

BRIEF DESCRIPTION OF DRAWINGS

Example embodiments of the present invention will become more apparent by describing in detail example embodiments of the present invention with reference to the accompanying drawings, in which.

DETAILED DESCRIPTION

In the present specification, an expression used in the singular encompasses the expression of the plural, unless it has a clearly different meaning in the context. In the present specification, terms such as "comprising" or "including," etc., should not be interpreted as meaning that all of the elements or operations are necessarily included. That is, some of the elements or operations may not be included, while other additional elements or operations may be further included. Also, terms such as "unit," "module," etc., as used in the present specification may refer to a part for processing at least one function or action and may be implemented as hardware, software, or a combination of hardware and software.

Hereinafter, a software defined network SDN of the invention will be briefly described.

Figure 1:
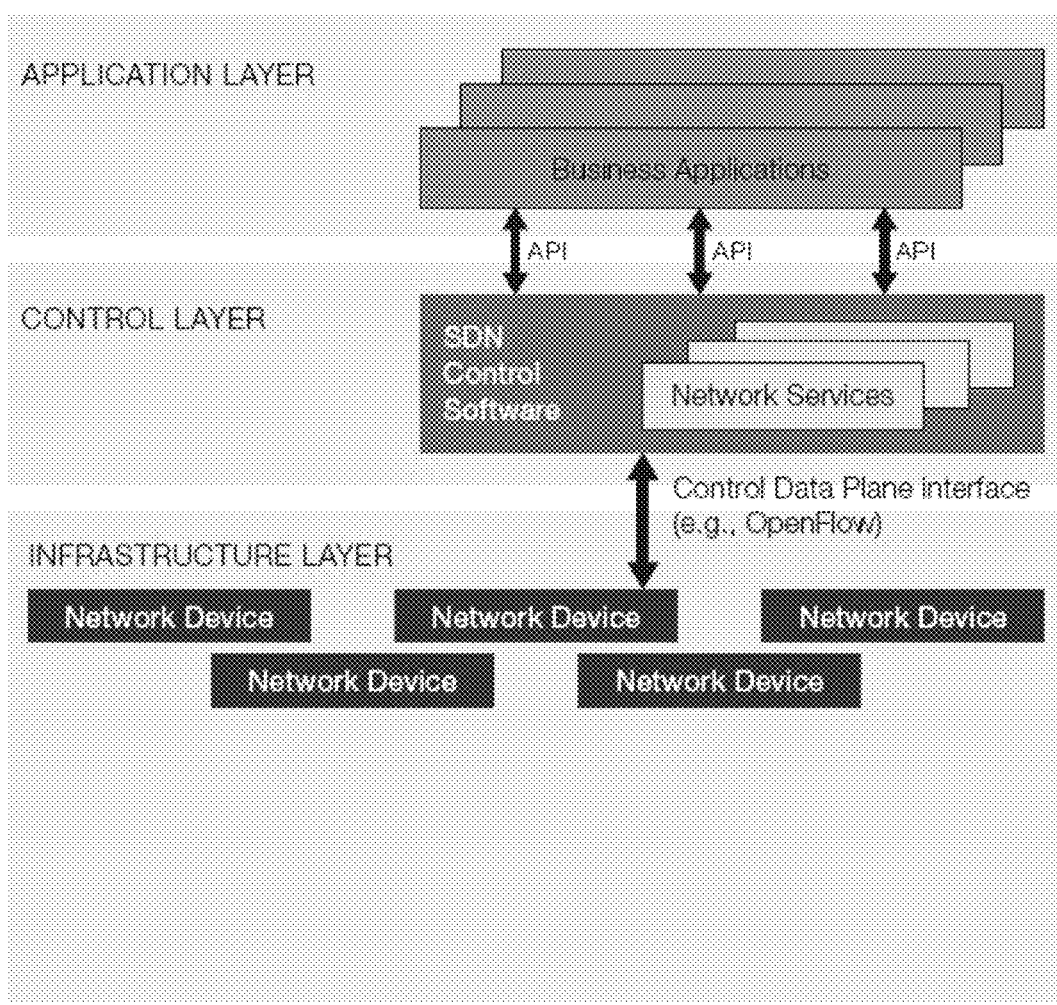
FIG. 1 is a view illustrating a basic architecture of SDN.
Figure 2:
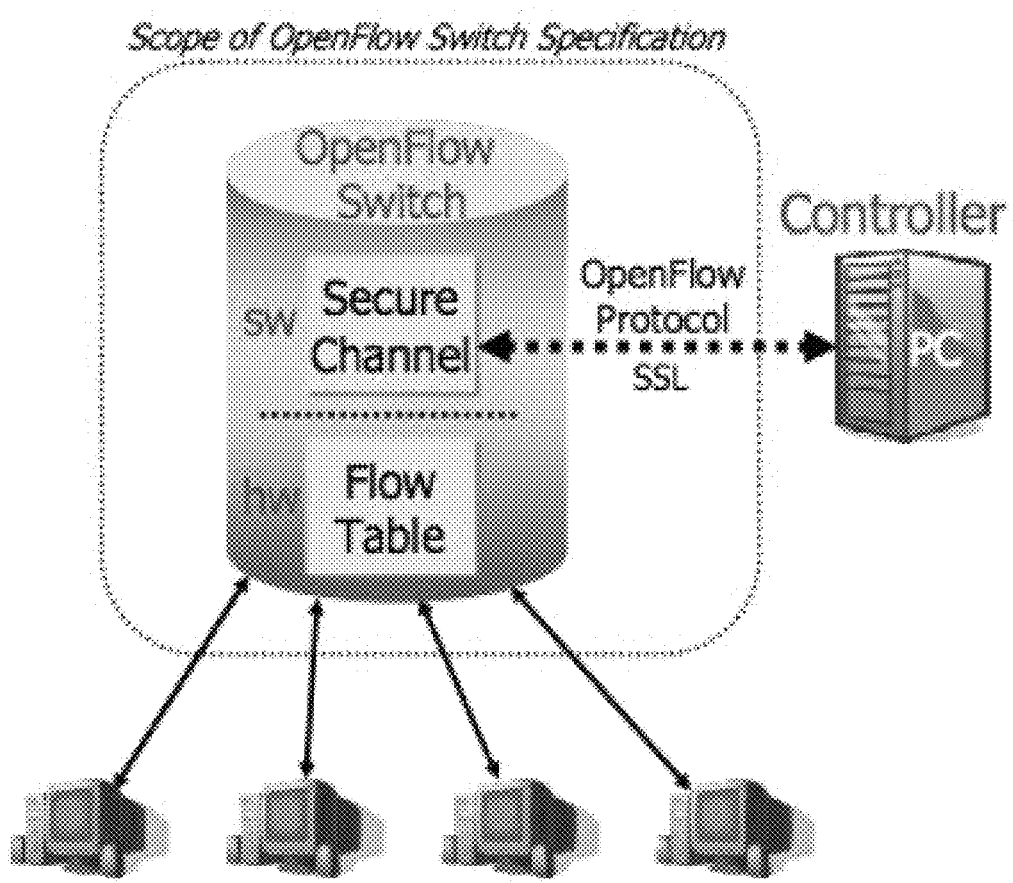
FIG. 2 is a view illustrating OpenFlow used in SDN.

FIG. 1 is a view illustrating a basic architecture of SDN, and FIG. 2 is a view illustrating OpenFlow used in SDN.

In FIG. 1, layers of the SDN are divided into an infrastructure layer corresponding to a data plane, a control layer corresponding to a control plane and an application layer.

The data layer is controlled through a specific interface of the SDN, and it is in charge of data transmission. The control layer controls flowing of data, and it determines whether it routes, delivers or rejects the flowing of data through an application and a network service. Additionally, the control layer organizes operations of the data layer and delivers the organization to the application layer in type of an application programming interface API. The application layer may perform various functions of a network by using APIs provided from the control layer.

In traditional network, network equipments such as a router or a switch take charge of traffic control and a rule. Hence, router information of the network is stored in the switch and the router. This network architecture has the problem in that a manager arranges related internet equipments whenever the network is changed and a data center or a group network environment wastes resources due to frequent network changing.

An OpenFlow is a technique, used as an interface standard between the controller and the network equipment, for supplementing the above problem of the traditional network. Referring to FIG. 2, the OpenFlow may manage the network under dividing the control plane and the data plane, thereby separating a function of controlling network traffic and a function of delivering data and controlling the network by using built software. If an OpenFlow protocol is used, the control plane and the data plane may be made with software not hardware. Furthermore, new function may be rapidly realized by installing the software to a general server.

The OpenFlow may generate one information by combining header information of protocol layer 1 to protocol layer 4 and designate operation of a packet (frame) by using the one information. If a program of the control plane is amended, a user may generate freely new protocol in the range of the protocol layer 1 to the protocol layer 4 and achieve a network optimized to a specific service or application. That is, the OpenFlow divides the function of controlling the packet and the function of delivering the packet and controls the network via the programming.

The SDN capable of detecting the DDoS attack of the invention will be described in detail with reference to the above description.

Figure 3:
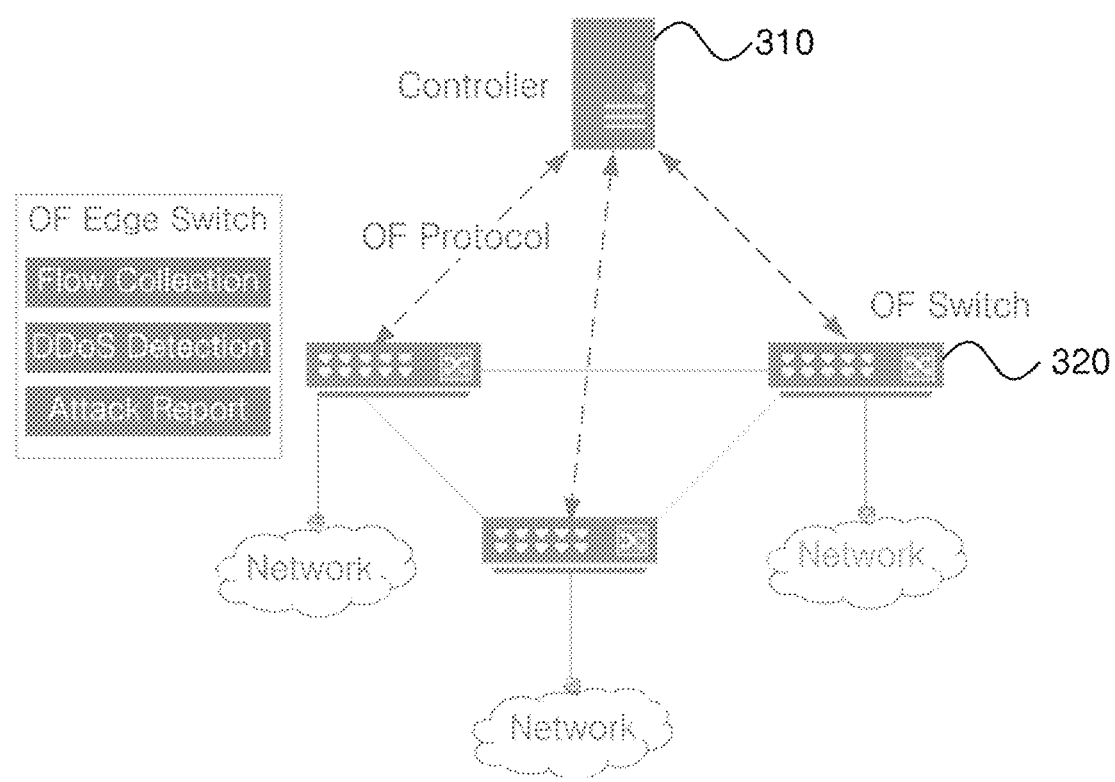
FIG. 3 is a view illustrating coarse structure of an SDN according to one embodiment of the invention.

FIG. 3 is a view illustrating coarse structure of an SDN according to one embodiment of the invention.

In FIG. 3, the SDN 300 of the present embodiment uses for example an OpenFlow(OF) interface, and includes a controller 310 and plural switches 320.

The controller 310 indicates an OF controller corresponding to the OpenFlow interface, and is arranged on the control plane. The controller 310 performs every control instruction of the network and delivering of data traffic, and controls directly whole network.

Each of the switches 320 means an OF switch corresponding to the OpenFlow, is arranged on the data plane, and is connected to corresponding external network.

That is, the controller 310 transmits instructions to each of the switches 320. Each of the switches 320 transmits packets to a destination according to a received instruction, amends or discards the packets. The controller 310 delivers a forwarding method of the packet or a priority value of a VLAN, etc. to the switch 320 by using the OpenFlow protocol so that the switch 320 operates according to the delivered forwarding method or the priority value. The switch 320 inquires error information and information concerning a packet not corresponding to a pre-registered flow entry to the controller, receives determination of the controller in accordance with the inquiring and processes the packet in response to the determination.

Specially, the controller 310 performs path computation as a main function, and determines a path based on several parameters when the packet is transmitted. The parameters include weight of a path designated by the user or load distribution condition, etc. as well as shortest path SPF or line speed. Path information computed by the controller 310 is transmitted to the switch 320 via transport layer security TLS or general TCP connection and then it is stored in a flow table. Subsequently, the switch 320 verifies the flow table whenever it receives the packet and transmits corresponding frame through a designated path.

Each of the switches 320 may collect packets received through external network, and detect the DDoS attack by using the collected packets. That is, in the invention, the DDoS attack to the SDN may be detected in distributed manner by the switches 320.

Particularly, if the controller 310 detects the DDoS attack, each of the switches 320 may transmit periodically the flow table to the controller 310. The controller 310 may collect whole flow information through the flow tables transmitted from the switches 320, analyze the whole flow information and detect whether or not the DDoS attack is performed depending on the analyzing. However, since every DDoS attack is detected by the controller 310, the problems happen in that flow collection and processing is concentrated on the control plane and so overload occurs.

Accordingly, to solve the problems, each of the switches 320 detects the DDoS attack, and specifically detects itself the DDoS attack without instruction of the controller 310. As a result, overload due to frequent flow collection between the controller 310 and the switch 320 may not occur.

Hereinafter, the switch 320 of the present embodiment will be described with reference to a drawing FIG. 4.

Figure 4:
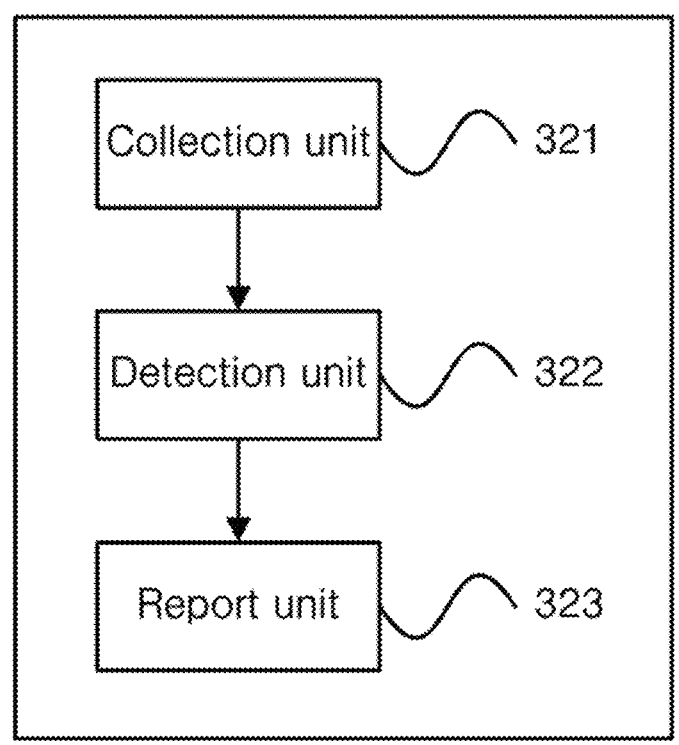
FIG. 4 is a block diagram illustrating schematically the switch according to one embodiment of the invention.

FIG. 4 is a block diagram illustrating schematically the switch according to one embodiment of the invention.

In FIG. 4, the switch 320 of the present embodiment includes a collection unit 321, a detection unit 322 and a report unit 323.

The collection unit 321 collects packets received through external network.

That is, the collection unit 321 may collect the packets using the flow table in the switch 320. In other words, the collecting unit 321 may collect packets by adding and expanding a copy of the counter of the number of packets of each flow item in the flow table. As a result, the collection unit 321 may collect easily the flow information during a monitoring period.

The detection unit 322 detects the DDoS attack by using the collected packets.

Particularly, the detection unit 322 may determine that the DDoS attack is detected, when entropy defined as following equation 1 is smaller than preset critical value. Accordingly, the detection unit 322 may process in real time massive traffic.

$$H = -\sum_{1}^{n} p_i \log p_i \qquad \text{[Equation 1]}$$

Where $$p_i = \frac{x_i}{n}$$

$$W = \{(x_1, y_1), (x_2, y_2), \ldots\}$$

Here, H, n, pi, x and y indicates respectively entropy, number of packets in a window W, probability of IP address of each of the packets in the window W, IP address of destination of the packets and time at which the packets are generated.

The report unit 323 transmits a warning message to the controller 310 when the DDoS attack is detected. The controller 310 may track again external network including an attacker, by indicating every packet having an ID of the switch 320.

Briefly, the switch 320 of the present embodiment may detect and reduce effectively the DDoS attack applied to the controller 310. Additionally, one switch 320 may detect the DDoS attack in a local network in view of expandability. In the event that every switch 320 detects the DDoS attack, whole network attack may be detected.

Components in the embodiments described above can be easily understood from the perspective of processes. That is, each component can also be understood as an individual process. Likewise, processes in the embodiments described above can be easily understood from the perspective of components. The embodiments of the invention described above are disclosed only for illustrative purposes. A person having ordinary skill in the art would be able to make various modifications, alterations, and additions without departing from the spirit and scope of the invention, but it is to be appreciated that such modifications, alterations, and additions are encompassed by the scope of claims set forth below.

The invention claimed is:

1. A server for performing a software defined network (SDN) installed on the server and connected to at least one external network, the server comprising:
a controller arranged on a control plane of the SDN; and
a plurality of switches arranged on a data plane of the SDN,
wherein
each of the plurality of switches collects packets received through corresponding external network using a flow table,
when an entropy of the packets collected by a first switch of the plurality of switches is smaller than a predetermined threshold value, the first switch determines that a DDoS attack is detected and transmits a warning message to the controller, and the controller analyzes every packet having an ID of the first switch transmitted the warning message in order to track the corresponding external network having an attacker, and
the entropy is defined by the following equation:

$$H = -\sum_{1}^{n} p_i \log p_i$$

Where $$p_i = \frac{x_i}{n}$$

$$W = \{(x_1, y_1), (x_2, y_2), \ldots\}$$

where, H, n, $p_i$, x and y indicates respectively entropy, number of packets in a window W, probability of IP address of each of the packets in the window W, IP address of destination of the packets and time at which the packets are generated.

\* \* \* \* \*